Inventor
Victor R. Alexander

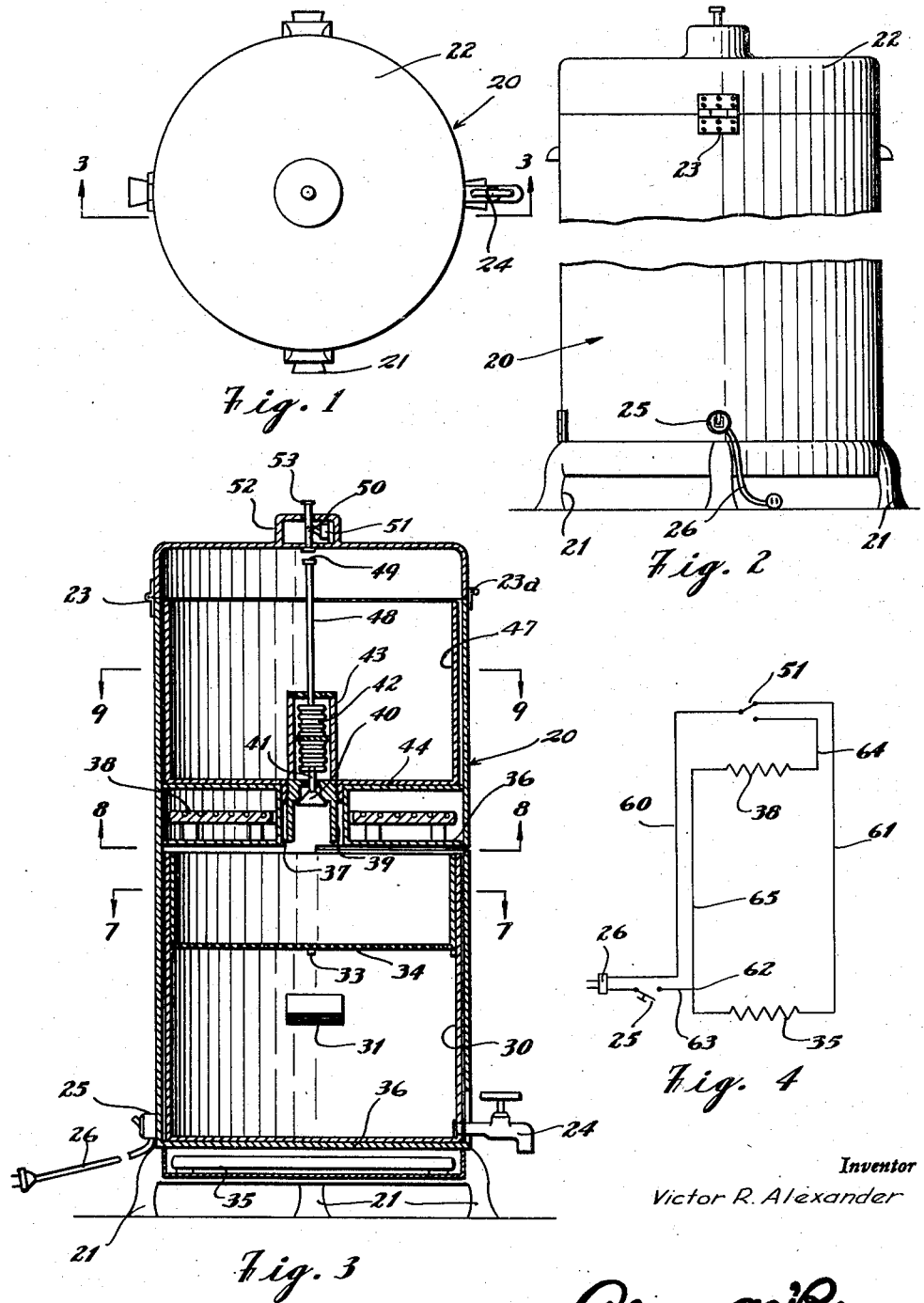

Patented Feb. 21, 1950

2,498,386

UNITED STATES PATENT OFFICE 2,498,386

COFFEE-MAKING APPARATUS

Victor R. Alexander, Independence, Mo.

Application November 19, 1945, Serial No. 629,399

1 Claim. (Cl. 99—282)

This invention relates to coffee making apparatus, and more particularly to electrically controlled apparatus therefor.

A primary object of this invention is to make coffee in an improved manner.

An additional object of the invention is to control the apparatus in which the coffee is being made through a plurality of heating elements in such manner that one element will be automatically deenergized when the coffee has reached the proper temperature to permit the completion of the coffee making process.

A still further object of the invention is to provide a thermostatic control element in conjunction with a coffee making device which will automatically shut off one heating element and cut in another when the coffee in the upper portion of a receptacle therefor becomes heated to a predetermined degree.

Other objects reside in the combinations of elements, arrangements of parts, features of construction, all as will be more fully pointed out hereinafter and disclosed in the accompanying drawings wherein there is shown a preferred embodiment of this inventive concept.

In the drawings:

Figure 1 is a top plan view of one form of apparatus embodying features of the instant invention.

Figure 2 is a side elevational view of the device shown in Figure 1, certain portions thereof being broken away.

Figure 3 is a longitudinal sectional view taken substantially along the line 3—3 of Figure 1 as viewed in the direction indicated by the arrows.

Figure 4 is a schematic view of the wiring diagram for the apparatus.

Similar reference characters refer to similar parts throughout the several views of the drawing.

Figures 5, 6:
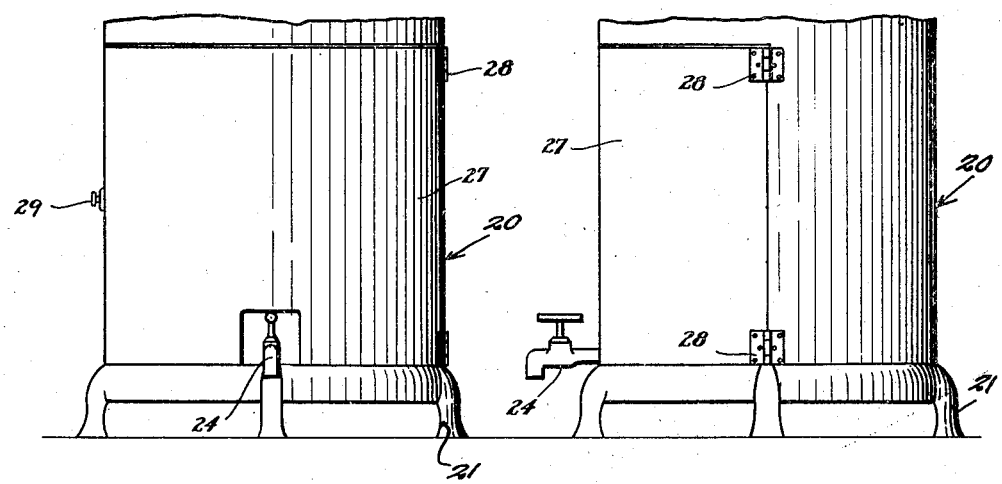
Figure 5 is a fragmentary view showing certain portions of the exterior of the receptacle.
Figure 6 is a view similar to Figure 5 but viewed at right angles thereto.

Having reference now to the drawings, and more particularly to Figures 1 and 2, the device of the instant invention includes an outer receptacle or body portion generally designated 20 placed preferably on legs 21, for support, and open at its top. A cover member 22 is provided, hinged as at 23 to one side of the container, and provided with a latch member 23a at its other side to hold the cover in closed relation.

As best seen in Figure 3, the container 20 is provided with a faucet 24 adjacent the base thereof, and a two-positioned on and off switch 25 on the opposite side thereof to which switch is connected a cord 26 adapted to lead to any desired source of electrical energy.

As best shown in Figures 5 and 6, the lower portion of the container 20 is provided with a door 27 hinged as at 28 to the sides of the container, and provided with a latch 29, adapted to permit the insertion and removal of an inner receptacle 30 into and from the device.

Figure 14:
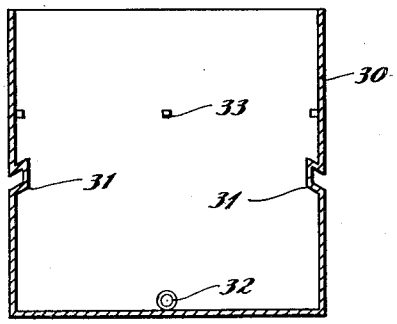
Figure 14 is a longitudinal sectional view taken through one of the containers comprising a feature of the invention.

Receptacle 30 is provided as best shown in Figure 14 with indentations 31 to serve as handles, an aperture 32 adapted to communicate with the spigot or faucet 24, and projections 33 adapted to support a container 34 for coffee or the like, as best shown in Figure 3. A heating element 35 is positioned at the base of the device adapted to underlie a plate 36 upon which receptacle 30 is adapted to rest.

Figures 7, 8:
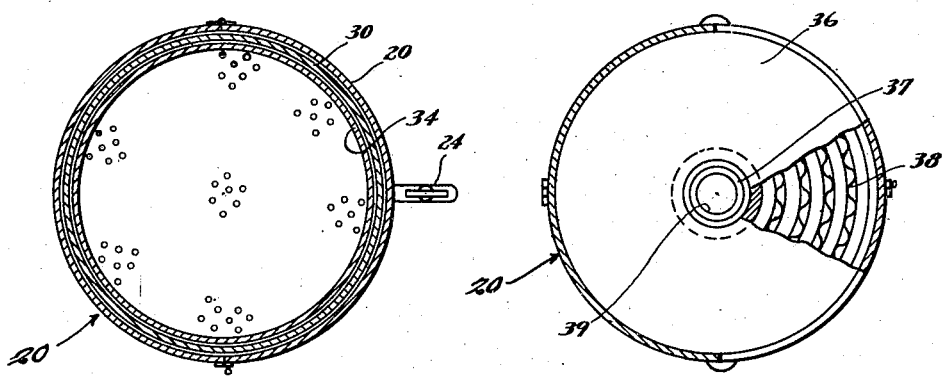
Figure 7 is a sectional view taken substantially along the line 7—7 of Figure 3, as viewed in the direction indicated by the arrows.
Figure 8 is a sectional view taken substantially along the line 8—8 of Figure 3, as viewed in the direction indicated by the arrows.
Figure 9:
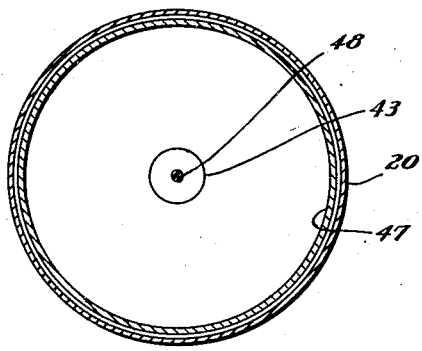
Figure 9 is a sectional view taken substantially along the line 9—9 of Figure 3, as viewed in the direction indicated by the arrows.
Figure 10:
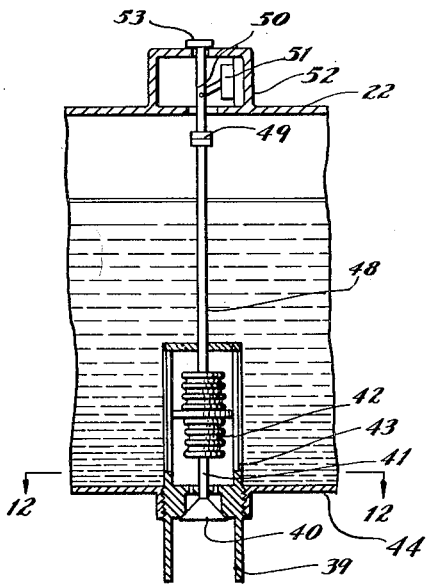
Figure 10 is a fragmentary enlarged sectional view taken through the longitudinal center line of the device disclosing the thermostatic switch and valve mechanism therefor.
Figure 11:
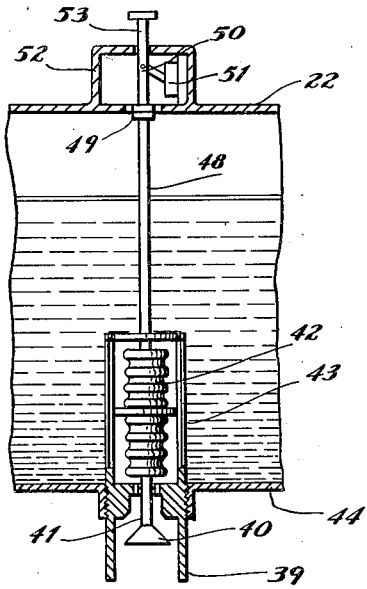
Figure 11 is a view similar to Figure 10 but showing the parts in different positions of adjustment.

The receptacle 34 is fully perforated in its base as best shown in Figure 7, and is adapted in the operation of the device to retain the coffee grounds during the process of making the coffee and after, if necessary.

Positioned just above the upper extremity of receptacle 30 is a plate 36 having a centrally positioned aperture 37 therein, around which aperture extends a second heating element 38.

A bushing 39 seated in the centrally positioned aperture of the plate serves as a valve seat for a cone valve 40. The valve stem 41 of cone valve 40 is connected to a bellows type thermostat 42, which is carried by a supporting bracket 43 carried by the upper portion of a plate 44 which carries the bushing 39.

Figure 12:
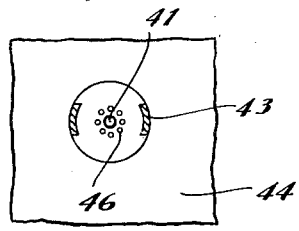
Figure 12 is a sectional view taken substantially along the line 12—12 of Figure 10 disclosing constructional details.
Figure 13:
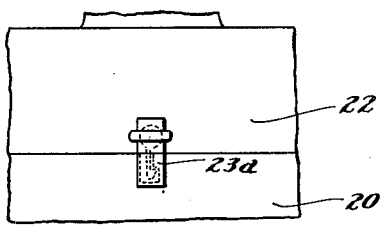
Figure 13 is a fragmentary side view disclosing additional constructional details.
Figure 15:
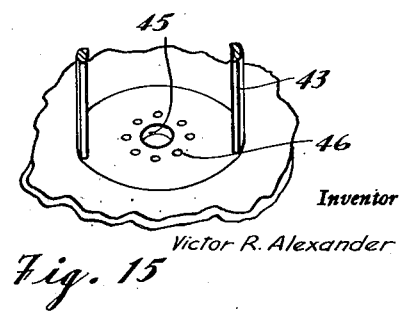
Figure 15 is a fragmentary perspective view showing a further constructional detail.

As best shown in Figures 12 and 15, the aperture forming the valve at the upper extremity of the bushing 39 is comprised of a central aperture 45 through which valve stem 41 extends and a plurality of relatively minute perforations 46 surrounding the same. The purpose of these relatively minute apertures is to permit passage of fluid, in a manner and for a purpose to be more fully described hereinafter to pass relatively slowly through the valve and its associated bushing and apertures into the receptacle 34.

As best shown in Figure 3, the upper body portion of receptacle 20 may support on plate 44 a receptacle 47, adapted initially to contain water to be heated to pass through the coffee grounds to ultimately form the coffee, which it is noted, is to be drawn from the receptacle 30.

Extending upwardly from the bellows thermostat 32 is a push rod or stem 48, the upper extremity of which is adapted to engage a push button type member 49 connected through an arm 50 to a two-position switch 51. The switch 51 is contained in a boss 52 on the cover 22 of the device, and the opposite end 53 extends outwardly through the boss to form a manual control for the device.

Referring now to the schematic wiring diagram disclosed in Figure 4, it will be seen that a wire 60 leads from the input wire 26 to switch 51, from one pole of which a wire 61 leads through heater 35 to a junction 62, from which a wire 63 leads to the off and on switch 25. From the other pole of the switch 51 a wire 64 leads through heating element 38 to a wire 65, which in turn leads to the junction 62 and thence to the switch 25.

In the operation of the device it will be readily understood that the upper receptacle 47 is filled with water, and the portion 34 of the lower receptacle 30 is filled with coffee preferably ground for drip coffee making. The switch 25 is now moved to circuit closing position, and the switch 53 pushed downwardly, which closes the circuit through wires 65, heater 38, wire 64 and wire 60 back to the circuit inlet. It will be readily understood that since the water in the device is initially cold, the bellows thermostat 42 is contracted and the rod 48 correspondingly retracted to permit such operation.

However, as the temperature reaches a predetermined point, preferably in the neighborhood of the boiling point, the thermostat expands forcing the rod 48 upwardly and moving the switch 51 through the push rod 50 to its opposite position, simultaneously deenergizing heating element 38, and through wire 61 energizing heating element 35. Simultaneously the valve 40 is opened by the expansion of the bellows and the water is permitted to drip through the perforations 46 into the receptacle 34 containing the ground coffee. As the boiling water permeates through the coffee to the bottom of the device in making the coffee in the well-known manner the finished coffee drips through into the receptacle 30 in which it is kept constantly hot by the heating element 35. Obviously the coffee may be drawn from the lower receptacle by means of the faucet 24 in any quantity desired.

From the foregoing it will now be seen that there is herein provided a relatively simple and economical automatic device for the automatic manufacture of coffee necessitating no attention on the part of an individual operator, which will heat the water to the desired predetermined temperature and automatically, upon the achievement of such temperature permit the same to drip through coffee grounds to provide finished coffee in the lower receptacle, and which will automatically maintain the finished coffee in heated condition as long as may be desired. It will also be seen that there is herein provided a device which accomplishes all the objects of this invention, and others, including many advantages of great practical utility and commercial importance.

As many embodments may be made of this inventive concept, and as many modifications may be made in the embodiment hereinbefore shown and described, it is to be understood that all matter herein is to be interpreted merely as illustrative and not in a limiting sense.

I claim:

In a coffee maker, an outer receptacle having a cover and upper and lower heating elements enclosed in chambers and secured to said outer receptacle, a lower receptacle being removably positioned in said outer receptacle above said lower heating element, said lower receptacle having a coffee basket attached thereto, an upper receptacle positioned above said upper heating element, thermostatic means positioned in said upper receptacle, a plurality of restricted flow apertures communicating with the interior of said upper receptacle, a valve controlling flow through said apertures from said upper receptacle through said coffee basket into said lower receptacle, said thermostatic means controlling said valve, said thermostatic means operatively engaging a two-way switch on said cover having contact portions extending interiorly thereof, said two-way switch both controlling alternately the energization of said upper and lower heating elements and said thermostatic means, said two-way switch having manually operated means positioned exteriorly of said outer container, said two-way switch, said thermostatic means, and said valves providing either automatic or manual means for both controlling flow from said upper container through said coffee basket to said lower container, and means for selectively energizing said heating elements.

VICTOR R. ALEXANDER.

REFERENCES CITED

The following references are of record in the file of this patent:

UNITED STATES PATENTS

| Number | Name | Date |
| --- | --- | --- |
| 1,317,717 | McKenney | Oct. 7, 1919 |
| 1,836,520 | Xardell | Dec. 15, 1931 |
| 1,869,720 | Strand et al. | Aug. 2, 1932 |
| 2,005,764 | Wilcox | June 25, 1935 |
| 2,101,819 | Roehrich | Dec. 7, 1937 |
| 2,112,156 | Harper | Mar. 22, 1938 |
| 2,268,633 | Aske | Jan. 6, 1942 |

FOREIGN PATENTS

| Number | Country | Date |
| --- | --- | --- |
| 15,794 | Great Britain | 1893 |
| 482,649 | Germany | Sept. 18, 1929 |
| 717,909 | France | Oct. 26, 1931 |